US006038434A

United States Patent [19]
Miyake

[11] Patent Number: 6,038,434

[45] Date of Patent: Mar. 14, 2000

[54] METHOD OF AND APPARATUS FOR RECEIVING AND DISPLAYING RDS DATA

[75] Inventor: Takashi Miyake, Kawagoe, Japan

[73] Assignee: Pioneer Electronic Corporation, Tokyo-to, Japan

[21] Appl. No.: 08/855,696

[22] Filed: May 8, 1997

Related U.S. Application Data

[63] Continuation of application No. 08/446,068, May 19, 1995, abandoned.

[30] Foreign Application Priority Data

May 19, 1994 [JP] Japan .................................... 6-105316

[51] Int. Cl.[7] ...................................................... H04B 1/18

[52] U.S. Cl. ........................... 455/186.1; 455/45; 455/77; 455/158.2

[58] Field of Search ............................. 455/186.1, 185.1, 455/186.2, 166.1, 166.2, 45, 38.2, 38.4, 77, 188.1, 158.4, 158.5, 158.2; 340/825.44

[56] References Cited

U.S. PATENT DOCUMENTS

| | | | |
|---|---|---|---|
| 4,392,246 | 7/1983 | Niioka et al. | 455/158 |
| 4,477,807 | 10/1984 | Nakajima et al. | 340/825.44 |
| 4,988,991 | 1/1991 | Motegi | 340/825.5 |
| 5,101,508 | 3/1992 | Owaki | 455/158.2 |
| 5,214,792 | 5/1993 | Alwadish | 455/45 |
| 5,258,751 | 11/1993 | DeLuca et al. | 340/825.44 |
| 5,355,527 | 10/1994 | Owaki | 455/186.2 |
| 5,410,361 | 4/1995 | Lee | 348/570 |
| 5,450,492 | 9/1995 | Hook et al. | 380/28 |
| 5,497,372 | 3/1996 | Nankoh et al. | 370/69.1 |
| 5,606,712 | 2/1997 | Hidaka | 395/800 |

*Primary Examiner*—Lee Nguyen
*Attorney, Agent, or Firm*—Young & Thompson

[57] ABSTRACT

A method of receiving and displaying RDS data, which are multiplexed to a broadcast electric wave, includes the steps of: receiving the broadcast electric wave; detecting predetermined data in the RDS data, which are included in the received broadcast electric wave; storing at least one of the detected predetermined data into a memory device; selecting the stored predetermined data on the basis of an externally generated instruction; and displaying the selected predetermined data.

19 Claims, 7 Drawing Sheets

METHOD OF AND APPARATUS FOR RECEIVING AND DISPLAYING RDS DATA

This application is a continuation of application Ser. No. 08/446,068, filed May 19, 1995, now abandoned.

BACKGROUND OF THE INVENTION

1. Field of the Invention

The present invention generally relates to a method of and an apparatus for receiving an FM (Frequency Modulation) broadcast electric wave, and more particularly to a method of and an apparatus for receiving RDS (Radio Data System) data, which are transmitted from an RDS broadcast station for transmitting digital data such as character information by multiplexing it to the FM broadcast electric wave, and displaying the received content of the RDS data.

2. Description of the Related Art

There are a plurality of FM broadcast networks in a country since the FM broadcast is more suitable for various geographical conditions than the AM (Amplitude Modulation) broadcast. Thus, there are a very large number of FM broadcast stations on the whole, so that 20 to 50 channels of the FM broadcasts may be received. Accordingly, there is a problem that it is difficult for the user to understand from which broadcasting station the FM broadcast which he is listening to is broadcasted, or what the broadcast frequency of the broadcasting station which he wished to listen to is.

For this reason, there is an RDS broadcast of transmitting data indicating network information, which the broadcasting station belongs to, and character data such as music title information of the broadcasted music and road traffic information by multiplexing those data on the FM broadcast electric wave.

The RDS broadcast is called as an RBDS (Radio Broadcast Data System) broadcast in the United States of America.

In this RDS broadcast, the third higher harmonic wave, which frequency is 57 KHz, of the pilot signal, which frequency is 19 KHz, is used as a sub-carrier wave in a frequency band range outside of that of the FM modulated wave. This sub-carrier wave is amplitude-modulated by data signal, which indicates the information related to the broadcast such as the program content and which is filtered and biphase-coded, to be the RDS data signal. This amplitude modulated sub carrier wave is frequency-modulated on the main carrier to be broadcasted.

The RDS data signal has a base band coding structure as follows.

Namely, the RDS data signal has a plurality of blocks each consisting of a plurality of bits. The groups are repeatedly multiplexed to be broadcasted. Each block consists of an information word and a bit check word. Some of the blocks have an RT (Radio Text) data, which are the character data.

Here, in this type of RDS receiving system, the character sequence is transmitted which has one meaning by use of a plurality of characters as the RT data. Thus, the data of a plurality of groups are necessary in order to broadcast the RT data having one meaning. If the presently broadcasted program is a music program, the information indicated by the RT data may be the title thereof. If the presently broadcasted program is a sport program such as a baseball broadcast, it may be results of games on other stadiums.

By displaying the above explained RT data, the user can obtain various information related to the broadcasted program.

However, since the RDS broadcast receiver is constructed such that the received RT data are displayed in the order of reception, there is a problem that, even if the user wishes to watch the RT data prior to the RT data multiplexed on the presently received broadcast wave, it cannot be displayed.

Namely, after the once received RT data are displayed, the nextly received RT data are decoded and displayed, so that the previously displayed content of the RT data cannot be displayed again.

Thus, it may be proposed to print out the received RT data one after another. However in this case, the size of the apparatus becomes large and is not suitable anymore as a small receiver such as an on-vehicle type.

SUMMARY OF THE INVENTION

It is therefore an object of the present invention to provide a method of and an apparatus for receiving and displaying the RDS data, which can selectively display one of the RT data which were received in the past.

The above object of the present invention can be achieved by a method of receiving and displaying RDS data, which are multiplexed to a broadcast electric wave, including the steps of: receiving the broadcast electric wave; detecting predetermined data in the RDS data, which are included in the received broadcast electric wave; storing at least one of the detected predetermined data into a memory device; selecting the stored predetermined data on the basis of an instruction from the external; and displaying the selected predetermined data.

According to the apparatus of the present invention, the broadcast electric wave is received. The predetermined data in the RDS data, which are included in the received broadcast electric wave are detected. The predetermined data in the RDS data may be RT (Radio Text) data. Here, at least one of the detected predetermined data are stored into a memory device. Then, the stored predetermined data are selected on the basis of an externally generated instruction. Finally, the selected predetermined data are displayed.

Consequently, the predetermined data which have been displayed in the past can be stored in the memory device, and the predetermined data can be selected and displayed among the stored data under a free control of the user.

As one aspect of the method of the present invention, the method further includes the step of selecting at least one of the stored predetermined data as write-protected data on the basis of an externally generated instruction. Thus, the stored predetermined data, which are desired to be maintained, can be selected as the write-protected data, among the predetermined data, which have been displayed in the past and are stored in the memory device. Accordingly, the stored predetermined data, which are desired to be maintained, can be prevented from being over-written erroneously by new predetermined data. On the other hand, the stored predetermined data, which are not desired to be maintained, can be renewed by over-writing it with new predetermined data.

As another aspect of the method of the present invention, the method further includes the step of notifying a fact that a storage of the detected predetermined data is completed and a position where the detected predetermined data are stored in the memory device when the storage of the detected predetermined data is completed in the storing step. Thus, the user can easily recognize the fact and the position. In this case, the fact and the position may be displayed on a display device. Alternatively, the fact and the position may be announced by a synthetic voice.

The above object of the present invention can be also achieved by an apparatus for receiving and displaying RDS data, which are multiplexed to a broadcast electric wave, provided with: a receiving device for receiving the broadcast electric wave; a detection device for detecting predetermined data in the RDS data, which are included in the received broadcast electric wave; a memory device for storing at least one of the detected predetermined data; a selection device for selecting the stored predetermined data on the basis of an externally generated instruction; and a display device for displaying the selected predetermined data.

Accordingly, the predetermined data which have been displayed in the past can be stored in the memory device, and the predetermined data can be selected by the selection device and displayed by the display device among the stored data under a free control of the user.

As one aspect of the apparatus of the present invention, the apparatus is further provided with a write-protection device for selecting at least one of the stored predetermined data as write-protected data on the basis of an externally generated instruction. Thus, the stored predetermined data, which are desired to be maintained, can be prevented from being over-written erroneously by new predetermined data, while the stored predetermined data, which are not desired to be maintained, can be renewed by over-writing it with new predetermined data.

As another aspect of the apparatus of the present invention, the apparatus is further provided with a notification device for notifying a fact that a storage of the detected predetermined data is completed in the memory device and a position where the detected predetermined data are stored in the memory device when the storage of the detected predetermined data is completed in the memory device. Thus, the user can easily recognize the fact and the position. In this case, the notification device may control the display device to display the fact and the position. Alternatively, the notification device may be an audio unit for announcing the fact and the position by a synthetic voice.

In another aspect of the apparatus of the present invention, the selection device may have an operation unit having a plurality of channel keys. Thus, the selection operation can be easily performed by the user by operating the keys. Alternatively, the selection device may have an operation unit having a scrolling key. Thus, the selection operation can be easily performed by an scrolling operation.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

(I) RDS data signal

First of all, the RDS data signal which is received by the embodiments is explained with reference to FIGS. 1 and 2.

Figure 1:
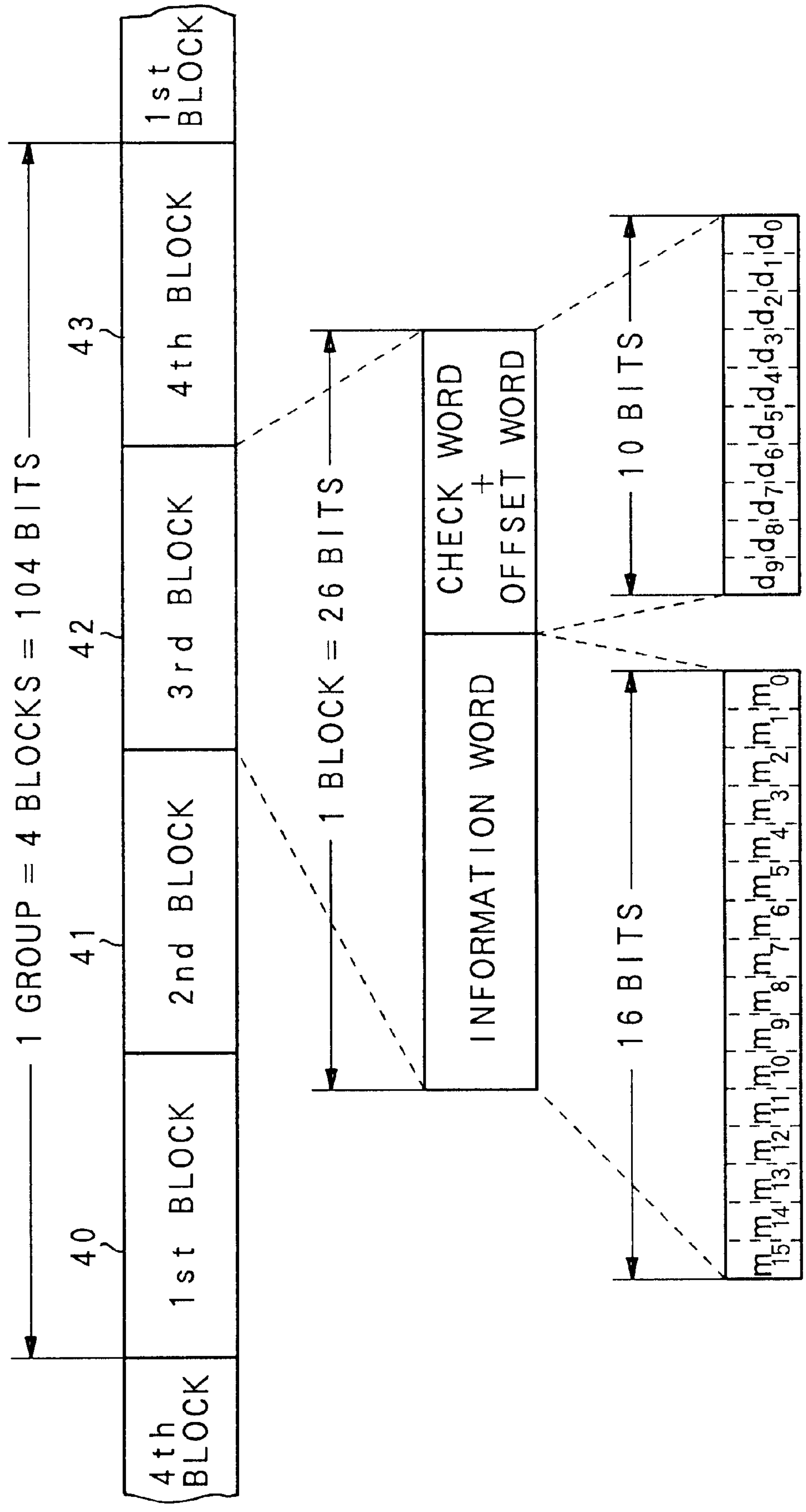
FIG. 1 is a diagram showing a data structure received in embodiments of the present invention.

A base band coding structure of the RDS data signal, which is broadcasting by the RDS broadcast, is shown in FIG. 1.

As clearly shown in FIG. 1, the RDS data signal is constructed such that each group consists of 104 bits and is repeatedly multiplexed to be broadcasted.

Each group consists of 4 blocks (1st block 40 to 4th block 43) each of which consists of 26 bits. Each block consists of a 16 bits information word and a 10 bits check word (which includes an offset word set in advance on the standard).

Here, there are 16 types of the above mentioned groups i.e. type 0 to type 15 in correspondence with the content thereof. Further, two versions i.e. a version A and a version B are defined with respect to each type (the type 0 to the type 15).

Nextly, among the above mentioned groups, the data structure of a type 2 A group is explained with reference to FIG. 2.

Figure 2:
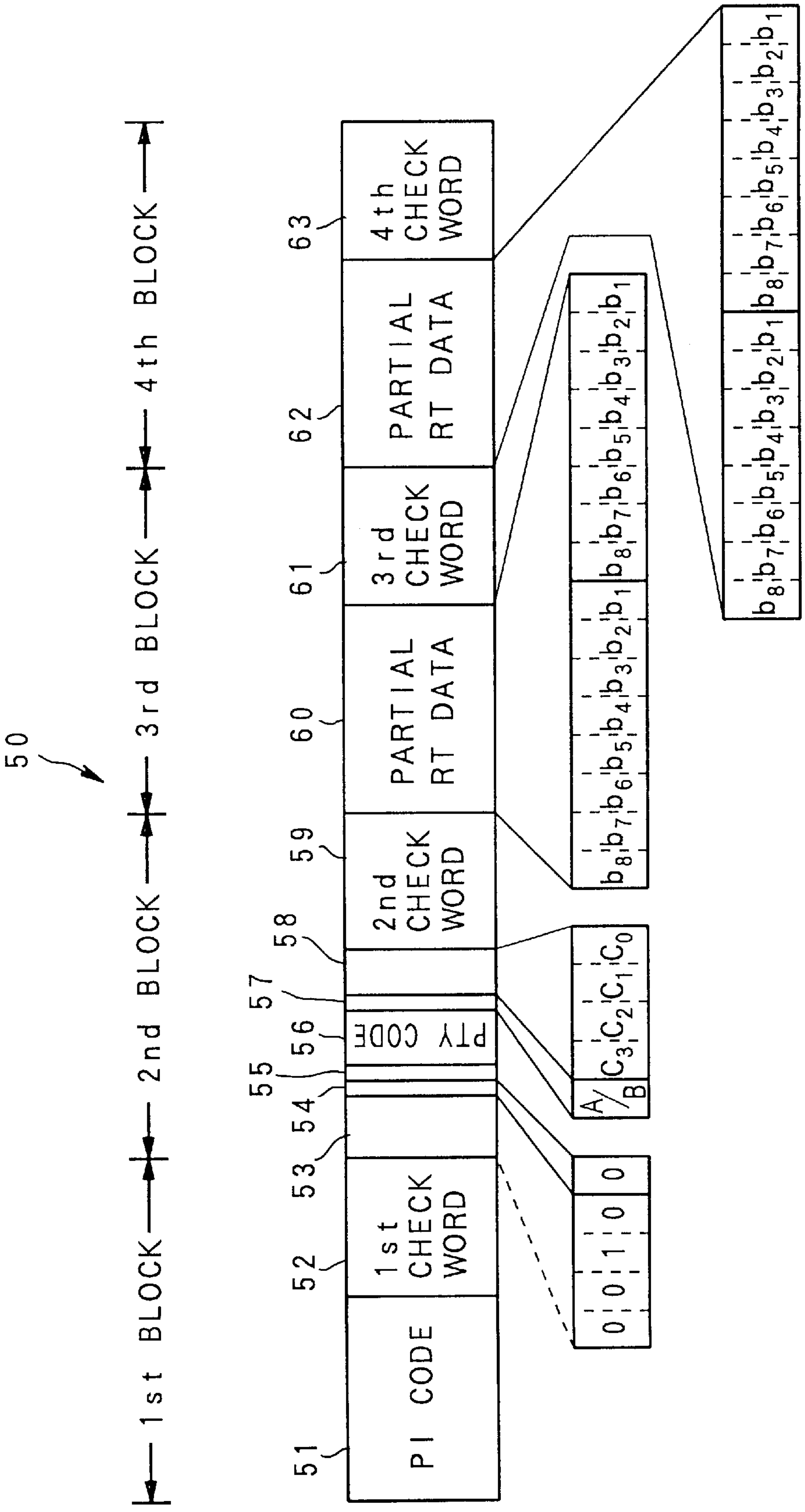
FIG. 2 is a diagram showing a data structure of a type 2 A group data received in the embodiments of the present invention.

In FIG. 2, in a type 2 A group 50, the 1st block has: a PI (Program Identification) code 51, which indicates the country name, the broadcasting station name and the network name which the broadcasting station belongs to; and a 1st check word 52 (plus a 1st offset word).

The 2nd block has: a group type code 53, which indicates the group type; a Bo code 54, which indicates the version in the group; a TP (Traffic Program identification) code 55, which indicates whether or not the traffic information is broadcasted; a PTY (Program Type) code 56, which indicates the type of the program which is presently broadcasted; a text A flag or a text B flag 57 to identify the two types of texts (the text A and the text B) included in the type 2 A group; a text segment address 58, which indicates the number of the character of the character data among the 64 characters corresponding to an RT (Radio Text) data, which is included in a partial RT data (explained later in detail) of the presently received group; and a 2nd check word 59 (plus a 2nd offset word).

The 3rd block has: a partial RT data (16 bits data indicating 2 characters) 60 which are character data; and a 3rd check word 61 (plus a 3rd offset word).

The 4th block has: a partial RT data (16 bits data indicating 2 characters) 62 which are the character data; and a 4th check word 63 (plus a 4th offset data) in the same manner as the 3rd block.

Here, the RT data which are the character data are explained.

As explained above, since the data of two characters volume are included as the partial RT data 60 in the 3rd block of the type 2 A group and the data of two characters volume are included as the partial RT data 62 in the 4th block of the type 2 A group, there are included the partial RT data of 4 characters volume in the data of one group i.e. the type 2 A group. Then, since it is standardized that the character sequence is transmitted which has one meaning by use of 64 characters as the RT data, the data of 16 type 2 A groups are necessary in order to broadcast the RT data having one meaning.

Here, it is possible to distinguish what number of the character of the data is indicated by the partial RT data included in the received data of the type 2 A group indicates, by decoding the data of the text segment address 58 included in the above explained 2nd block.

If the presently broadcasted program is a music program, the information indicated by the RT data (64 characters) may be the title thereof. If the presently broadcasted program is a sport program such as a baseball broadcast, it may be results of games in other stadiums.

By displaying the above explained RT data, the user can obtain various information related to the broadcasted program.

(II) Construction of the System

Nextly, a construction of an RDS broadcast receiving system in the embodiments of the present invention is explained with reference to FIG. 3.

Figure 3:
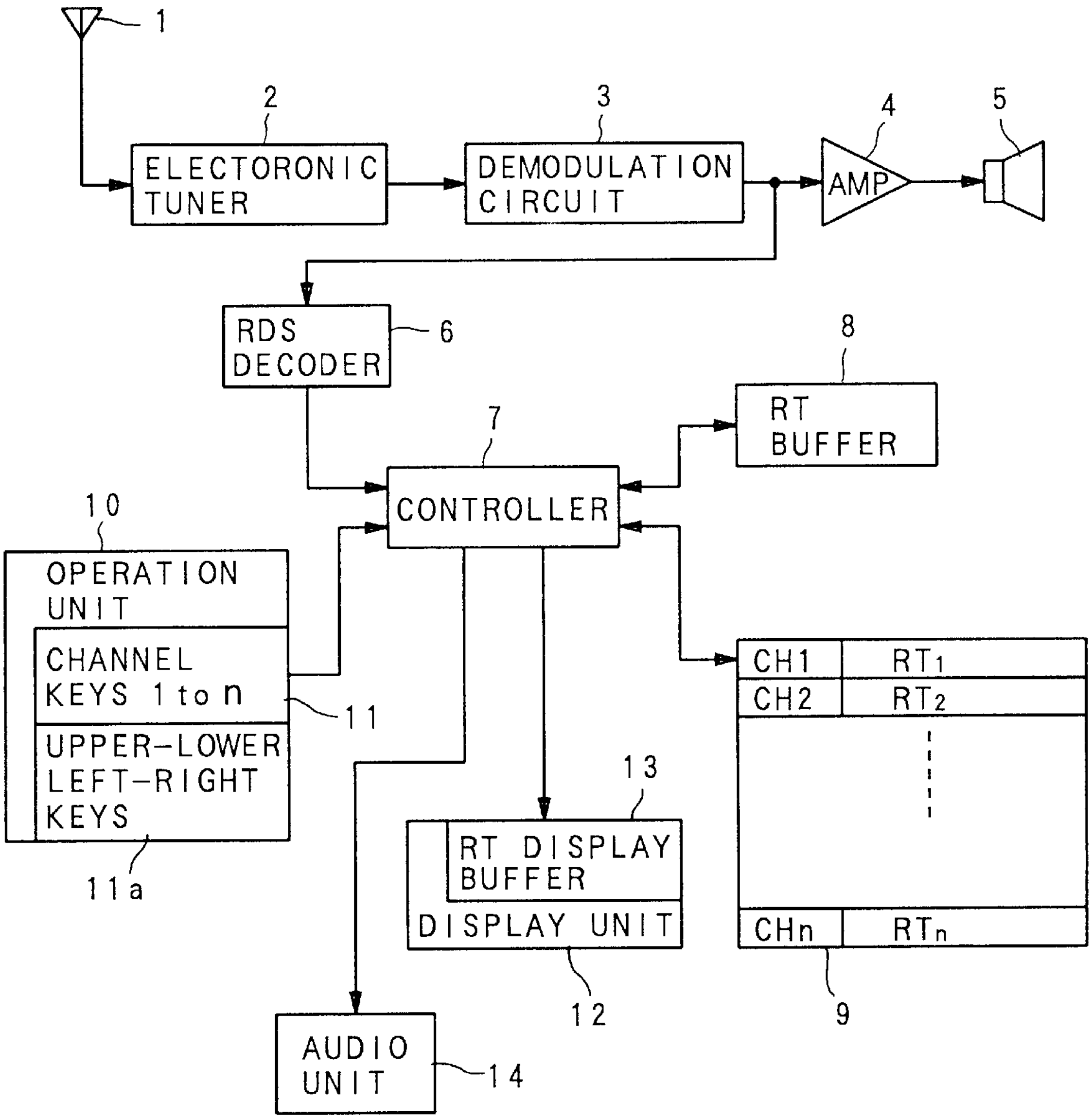
FIG. 3 is a block diagram of an RDS broadcast receiving system in the embodiments of the present invention.

In FIG. 3, an RDS broadcast receiving system in the embodiments is provided with: an antenna 1, to which an electric wave from a broadcasting station is inputted, for converting it to a high frequency electrical signal and outputting it to an electronic tuner 2; the electronic tuner 2 which includes a high frequency amplifier, a mixing circuit, a local oscillator, an intermediate frequency (IF) amplifier etc., for receiving the broadcasted wave in which the RDS data is multiplexed, generating the intermediate frequency signal out of the high frequency electric signal by synchronizing with the frequency corresponding to the phase lock frequency set in a PLL (Phase Lock Loop) circuit, and outputting it to a demodulation circuit 3; the demodulation circuit 3 for demodulating the intermediate frequency signal of the broadcasting station which has been selected and outputted, and converting it to an audio signal; an amplifier 4 for power-amplifying the audio signal; a speaker 5 for converting the power-amplified audio signal to a sound wave and outputting it to a space in a room of the automobile; an RDS decoder 6 for decoding RDS data which includes RT data as character data out of the broadcasted electric wave demodulated by the demodulation circuit 3, and outputting it to a controller 7; the controller 7, which includes a CPU (Central Processor Unit), for controlling the whole portion of the RDS broadcast receiving system according to an input from an operation unit 10; an RT buffer 8, which includes a RAM (Random Access Memory) having a memory capacity to store the RT data of 64 characters volume, for temporarily storing the RT data detected by the RDS decoder 6 under the control of the controller 7; an RT channel memory 9 having a plurality of memories or memory areas RT1 to RTn each including a RAM for storing the RT data (in the present embodiments, it is assumed that the total number of the memories is n), for storing one RT data in each memory; the operation unit 10, which has channel keys 11 from "1" to "n" corresponding to the memory number (i.e. the channel number) in the RT channel memory 9, and has an upper-lower and right-left keys lla to scroll the displayed RT data in the lateral direction and to switch the displayed channel without pressing the channel keys 11; a display unit 12 for displaying the content of the RT data outputted from the RT buffer 8 or the RT channel memory 9, on the basis of the instruction from the operation unit 10 which is inputted through the controller 7.

The display unit 12 is provided with an RT display buffer 13 for temporarily storing the inputted data so as to display the content of the data stored in the RT buffer 8 or the RT channel memory 9.

Further, instead of displaying the content of the RT data stored at the display unit 12 as it is, the content of the stored RT data may be converted to a voice data and outputted as a synthetic voice by an audio unit 14. In this case, the synthetic voice may be outputted from the speaker 5, or from an exclusive speaker for the synthetic voice.

(III) Storing Process in Embodiments

Nextly, the process of storing the RT data in the embodiments is explained with reference to a flow chart of FIG. 4.

Figure 4:
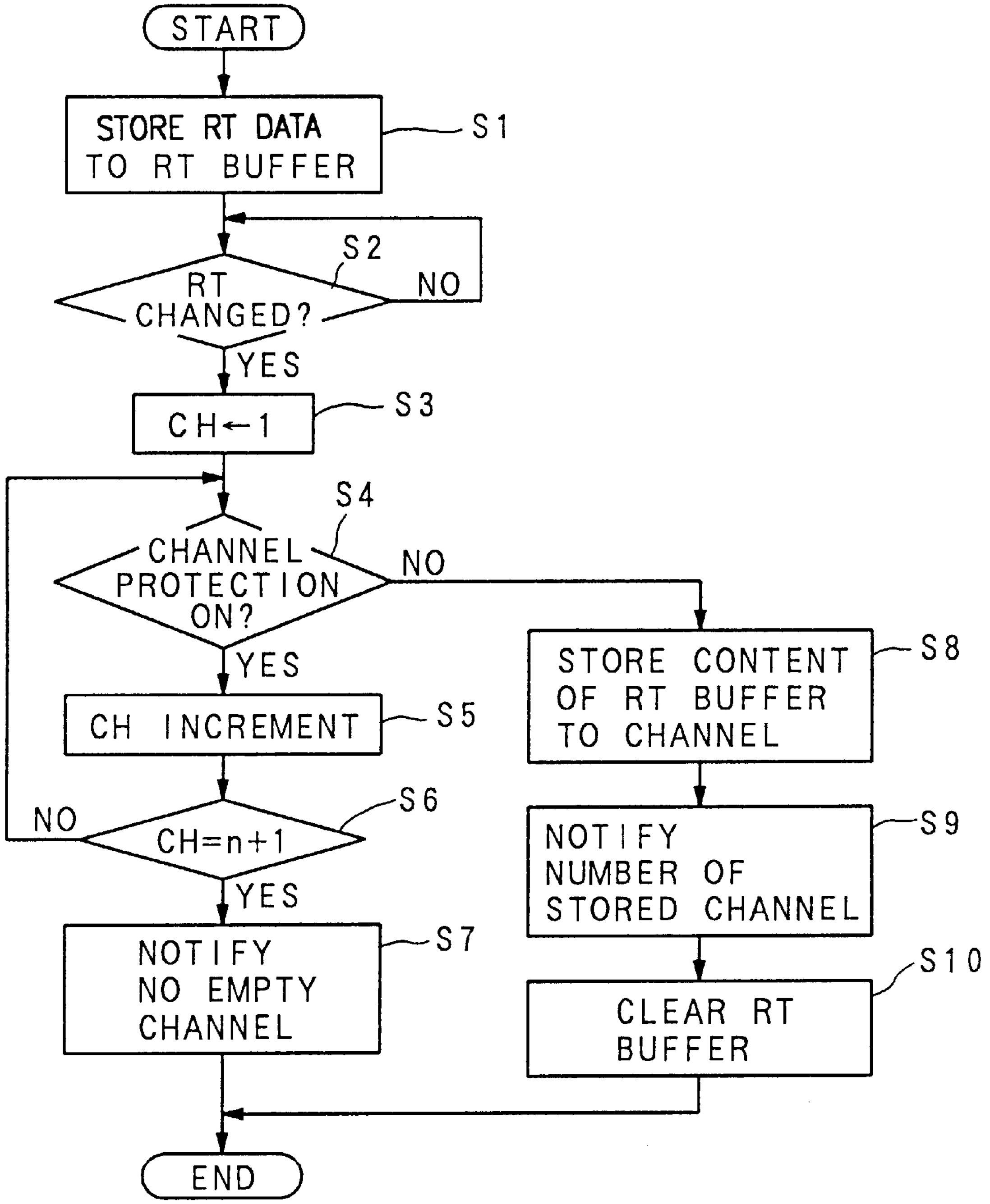
FIG. 4 is a flow chart of a storing process in the embodiments of the present invention.

The storing process shown in FIG. 4 is performed mainly by the controller 7, the RT buffer 8 and the RT channel memory 9.

In FIG. 4, firstly, the received RT data decoded by the RDS decoder 6 are stored to the RT buffer 8 at a step S1. The data stored at this time is the RT data of 64 characters volume.

Nextly, it is judged whether or not the RT data, which are decoded, are changed (step S2). This judgement is performed by judging whether or not one of the text A flag or the text B flag (indicated by the reference numeral 57 in FIG. 2) in the received RDS data is switched over to another. Namely, when one of the text A flag or the text B flag is switched over to another, the RT data is supposed to be also switched over, so that it is judged that a new RT data which are different from the previous one are received.

At the step S2, if the RT data are not changed (step S2: NO), the system waits until it does.

At the step S2, if the RT data are changed (step S2: YES), the flag data (channel indicator data), which indicate the channel (one of CH1 to CHn) in the RT channel memory, is set to be "1" (step S3).

Then, it is judged whether or not the channel indicated by the flag data is protected (i.e. it is in the write protect condition) (step S4). If the channel is protected (step S4: YES), the data content of the flag data is incremented by 1 as the RT data cannot be written into the memory corresponding to this channel (step S5). Then, it is judged whether or not the data content of the flag data becomes "n+l" (step S6). If it becomes "n+1" (step S6: YES), since it is concluded that there exists no empty channel able to write the RT data in the RT channel memory 9, this fact is notified on the display etc. (step S7), and the process is ended.

If the data content of the flag data does not become "n+1" (step S6:NO), the flow returns to the step S4 so as to search a next writable channel.

By this process, it becomes possible to prevent the RT data from being over-written, which the user wishes to maintain among the stored RT data.

At the step S4, if the channel is not protected (step S4: NO), the RT data which are stored in the RT buffer 8 are stored into the memory corresponding to this channel of the RT channel memory 9 (step S8).

After that, the channel number of this stored channel is notified by displaying it on the display unit 12, for example (step S9).

Then, after the RT buffer 8 is cleared (step S10), the process is ended.

According to the above explained storing process, it is possible to automatically store the decoded RT data to one channel memory or memory area, which is not protected, out of a plurality of channel memories or memory areas of the RT channel memory 9.

(IV) First Example of Channel Protecting Process

Nextly, a first example of the channel protecting process of the RT channel memory 9 in the present embodiments is explained with reference to a flow chart of FIG. 5.

Figure 5:
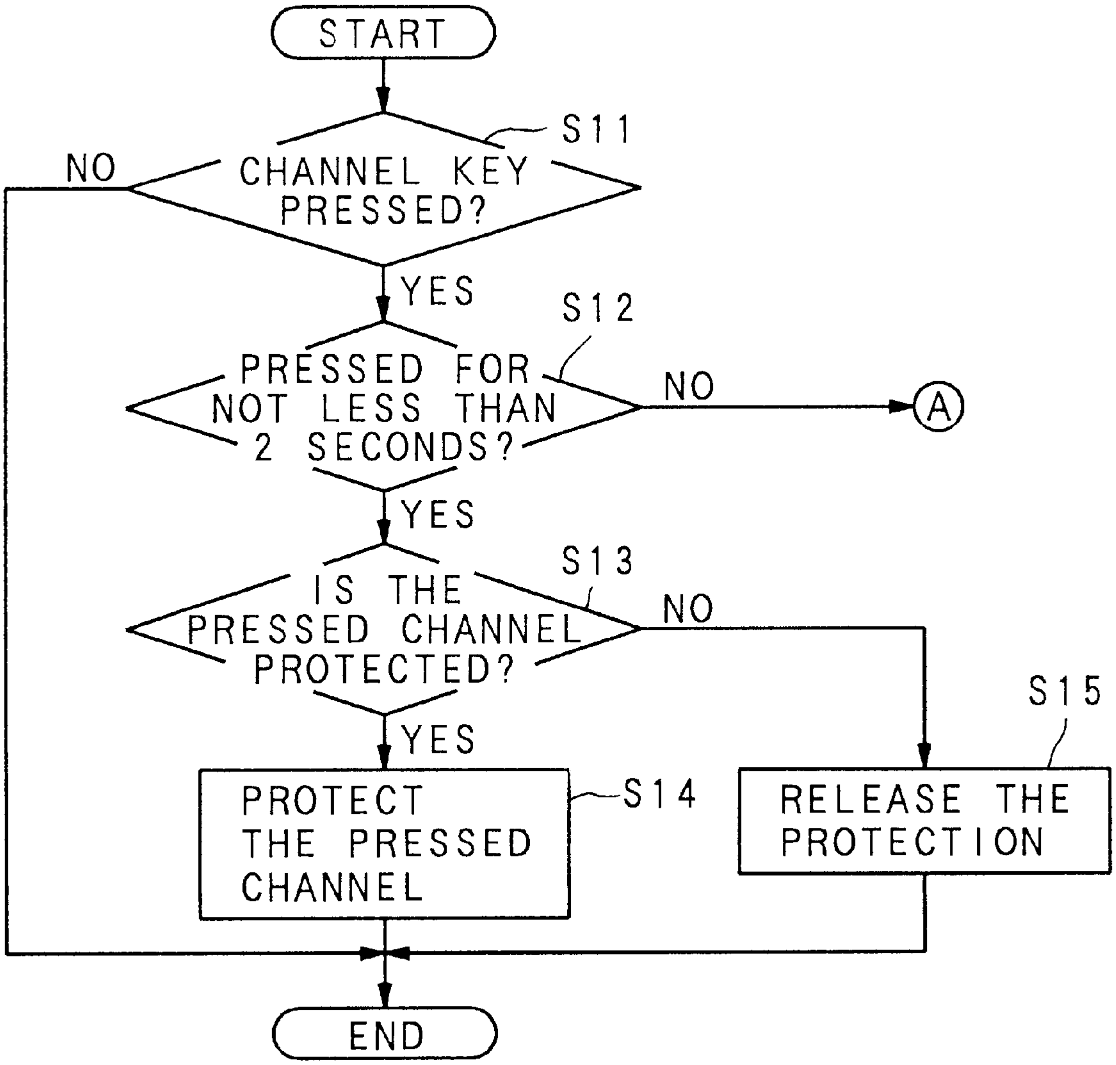
FIG. 5 is a flow chart of a first example of a channel protecting process in the embodiments of the present invention.

The protecting process shown in FIG. 5 is performed mainly by the controller 7, the channel key 11 of the operation unit 10 and the RT channel memory 9.

In FIG. 5, firstly, it is judged whether or not any one of the channel keys 11 from "1" to "n", which RT data are stored, is pressed (step S11). If none of the channel keys 11 are pressed (step S11:NO), the process is ended.

If any one of the channel keys 11 is pressed (step S11:YES), it is nextly judged whether or not it is pressed for a predetermined time period i.e. not less than 2 seconds (step S12).

If the time for pressing is less than 2 seconds (step S12:NO), the display process is performed since the key pressing operation does not indicate the protecting process but indicates the display process.

If it is pressed for not less than 2 seconds (step S12:YES), it is nextly judged whether or not the pressed channel is protected since the key pressing operation indicates the protecting process (step S13).

If the pressed channel is protected (step S13:YES), the protection is released (step S15) and the process is ended.

If the pressed channel is not protected (step S13:NO), the channel is protected so as not to over-write new RT data on it (step S14), and the process is ended.

This protecting process of the present embodiments is performed when the channel is to be protected in case that the RT data are desired to be maintained and displayed again after the channel which RT data are stored is notified (as in the step S9 of FIG. 5).

According to this protecting process of the present embodiments, it is possible to selectively protect the channel where the RT data, which the user wishes to maintain, are stored.

(V) Second Example of Channel Protecting Process

Nextly, a second example of the channel protecting process of the RT channel memory 9 in the present embodiments is explained with reference to a flow chart of FIG. 6.

Figure 6:
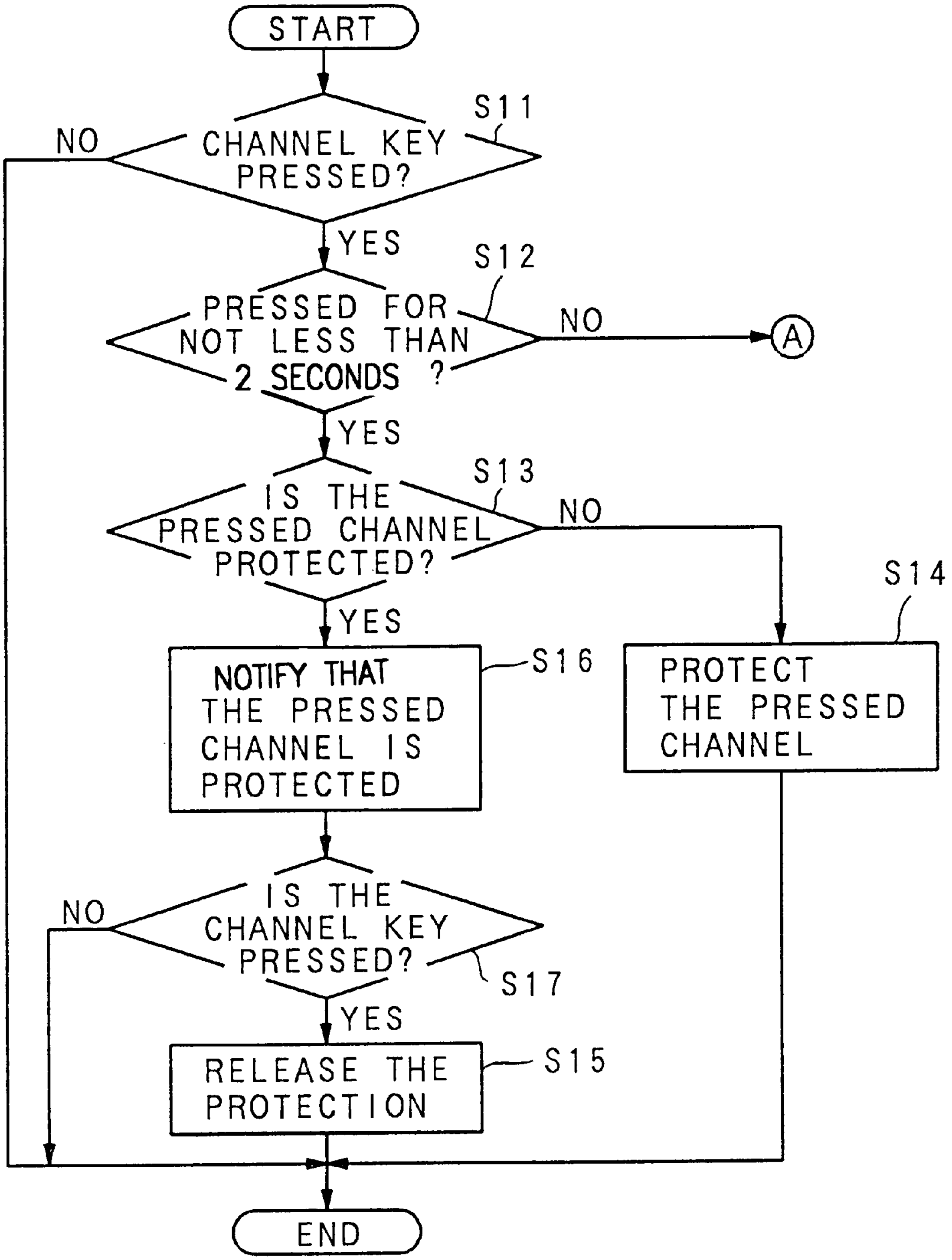
FIG. 6 is a flow chart of a second example of a channel protecting process in the embodiments of the present invention.

The protecting process shown in FIG. 6 is performed mainly by the controller 7, the channel key 11 of the operation unit 10 and the RT channel memory 9.

In the flow chart of FIG. 6, the steps same as those in the flow chart of FIG. 5 carry the same step numbers and the detailed explanation thereof are omitted.

The second example is the process to prevent an erroneous operation in the protecting process of the first example, in case that the protection of a channel, which should be protected, is to be erroneously released.

In this second example, the operation same as that of the protecting operation of the first example is performed from the step S11 to the step S14. Thus, the detailed explanations thereof are omitted.

At the step S13, if the pressed channel is protected (step S13:YES), this fact is notified on the display (step S16).

Nextly, it is judged whether or not the channel key corresponding to the channel displayed at the step S16 is further pressed (step S17). If the channel key corresponding to the displayed channel is further pressed (step S17:YES), the protection of the pressed channel is released as the user intends to release the protection of this channel (step S15).

If the channel key corresponding to the displayed channel is not further pressed (step S17:NO), the process is ended.

According to this channel protecting process of the present embodiments, even if the user erroneously tries to release the protection of the channel which should be protected, it can be prevented.

(VI) RT Data Displaying Process

Nextly, the RT data displaying process in the present embodiments is explained with reference to a flow chart of FIG. 7.

Figure 7:
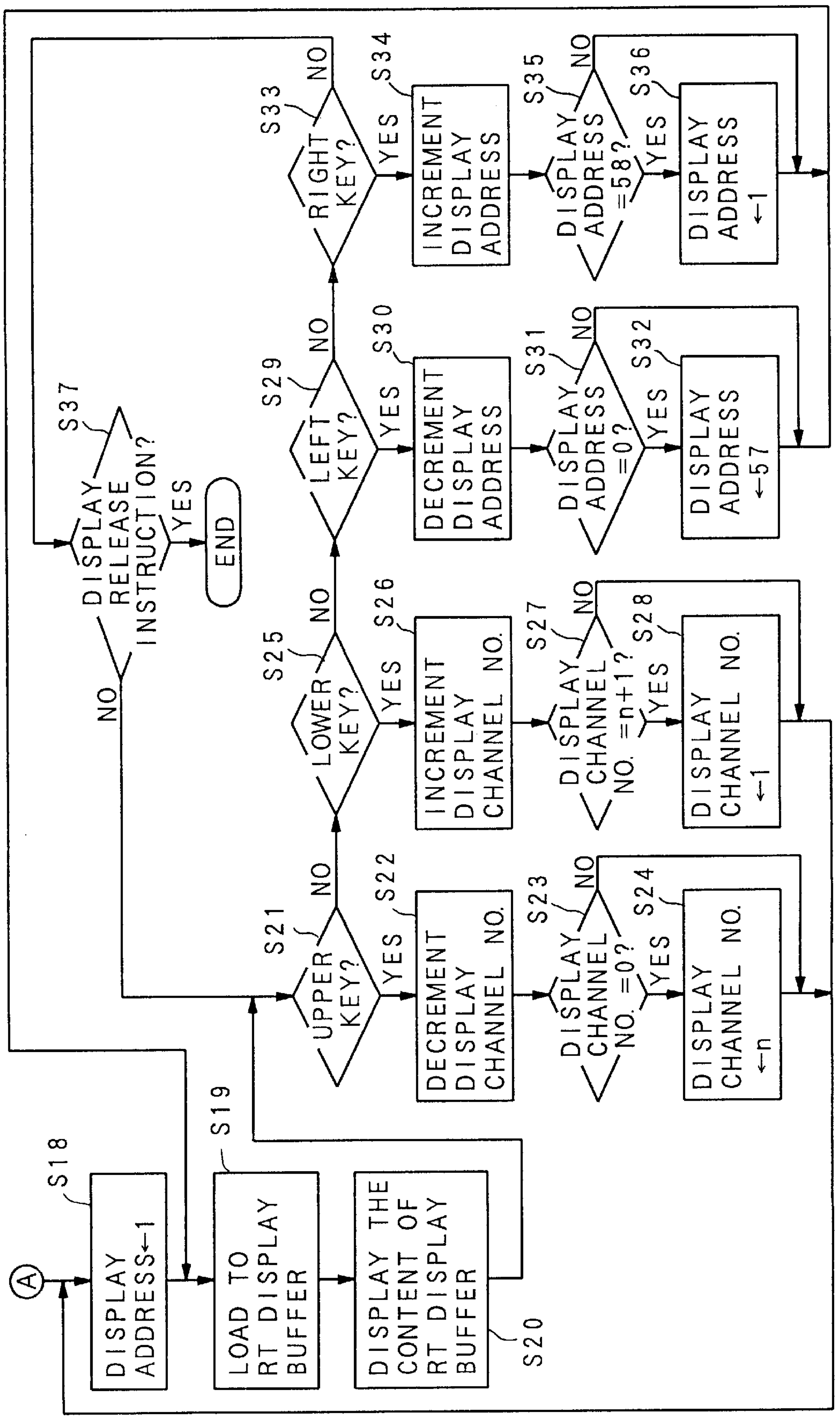
FIG. 7 is a flow chart of an RT data displaying process in the embodiments of the present invention.

The displaying process shown in FIG. 7 is performed mainly by the controller 7, the upper-lower and right-left keys 11*a* of the operation unit 10 and the display unit 12.

First of all, in case the channel key is pressed for less than 2 seconds at the step S12 in the first or second example of the channel protecting process (step S12:NO), the following displaying process is started.

In FIG. 7, firstly, the display address (which is defined as an address indicating the number of the character, from which the characters are to be displayed, among the whole characters in the RT data of 64 characters volume) of the specified channel is set to be "1" (step S18). Then, the content of the RT channel memory, which is indicated by this display address and the specified display channel, is read into the RT display buffer 13 in the display unit 12 (step S19). The content of the RT display buffer 13 is displayed on the display unit 12 as the character sequence (step S20).

Nextly, it is judged whether or not the upper key of the operation unit 10 is pressed (step S21). If it is pressed (step S21:YES), the display channel number is decremented by one as it is supposed that the RT data are to be displayed which are stored in the RT channel memory corresponding to the channel of the channel number which is less than the presently displayed channel (step S22).

Nextly, it is judged whether or not the condition "display channel number=0" is achieved (step S23).

If it is "0" (step S23:YES), the display channel number is set as "display channel number=n" (step S24) so as to indicated the content of the maximum display channel number.

Then, the flow returns to the step S18, and the RT data are displayed which are stored in the nth RT channel memory.

If the display channel number is not "0" (step S23:NO), the flow returns to the step S18 as it is, and the RT data are displayed which are stored in the RT channel memory of this display channel number.

If the upper key is not pressed at the step S21 (step S21:NO), it is judged whether or not the lower key is pressed (step S25). If it is pressed (step S25:YES), the display channel number is incremented by one as the RT data are to be displayed which are stored in the RT channel memory corresponding to the channel of the channel number greater than the presently displayed channel (step S26).

Nextly, it is judged whether or not the condition "display channel number=n+1" is achieved (step S27). If it is "n+1" (step S27:YES), the display channel number is set as "display channel number=1", so as to display the content of the display channel number 1 (step S28). Then, the flow returns to the step S18, and the RT data are displayed which are stored in the 1st RT channel memory.

If the display channel number is not "n+1" (step S27:NO), the flow returns to the step S18 as it is, and the RT data are displayed which are stored in the RT channel memory of this display channel number.

At the step S25, if the lower key is not pressed, it is judged whether or not the left key is pressed (step S29). If it is pressed (step S29:YES), the display address is decremented by one as the RT data are to be displayed from the character corresponding to the address smaller than the present display address (step S30). By this, the RT data display is scrolled to the right by the length of one character.

Nextly, it is judged whether or not the condition "display address=0" is achieved (step S31). If it is "0" (step S31:YES), the display address is set as "display address =57" so as to display the RT data from the 57th character (step S32). Then, the flow returns to the step S19, and the RT data are displayed from the 57th character.

If the display address is not "0" (step S31:NO), the flow returns to the step S19 as it is, and the RT data are displayed from the character corresponding to this display address.

Here, the reason why the display address is set as "display address=57" at the step S32 is to display the last 8 characters of the RT data altogether after the first one character of the RT data is displayed by returning to the first character, since the displayed portion of the RT data at the display unit 12 becomes to be 8 characters at the maximum because the display picture plane is commonly used with the display portion for the PS (Program Service name) data, which are the RDS data indicating the broadcasting station name to help the user to select the station.

If the left key is not pressed at the step S29, it is judged whether or not the right key is pressed (step S33). If it is pressed (step S33:YES), the display address is incremented by one as the RT data are to be displayed from the character corresponding to the address greater than the presently displayed address (step S34). By this, the RT data display is scrolled to the left by the length of one character.

Nextly, it is Judged whether or not the condition "display address=58" is achieved (step S35). If it is "58" (step S35:YES), the display address is set as "display address =1" so as to display the RT data from the 1st character (step S36). Then, the flow returns to the step S19, and the RT data are displayed from the 1st character.

If the display address is not "58" (step S35:NO), the flow returns to the step S19 as it is, and the RT data are displayed from the character corresponding to this display address.

Here, the reason why the display address is set as "display address=58" at the step S35 is to display the first 8 characters of the RT data altogether after the last 8 characters of the RT data are displayed, since the displayed portion of the RT data at the display unit 12 becomes to be 8 characters at the maximum in the same manner as in the step S32.

If the right key is not pressed at the step S33 (step S33:NO), it is judged whether or not the displaying process is To be ended i.e., the display release instruction is inputted from the operation unit 10 (step S37). If it is to be ended (step S37:YES), the process is ended as it is. If the displaying process is not to be ended (step S37:NO), the flow returns to the step S21.

According to the displaying process described above, the RT data stored in the RT channel memory can be continuously displayed for each channel without pressing the channel key 11, and the display of the RT data can be scrolled freely in the left or right direction.

In the above explained displaying process, although the display of the RT data is scrolled in the left and right direction, it may be scrolled in the upper and lower direction by constructing the display unit to display in the vertical direction.

As described above, according to the present embodiment, the user can instruct the RDS broadcast receiving system to store the data displayed in the past and selectively display the stored data.

Further, the user can select the data which he wishes to maintain out of data which have been displayed in the past and are stored while it is possible to prevent the selected data from being over-written by new data erroneously.

Furthermore, the user can recognize the fact that the data storage is completed which have been displayed in the past, and to which location in the memory device they are stored.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of receiving and displaying RDS data, which is multiplexed to a broadcast electric wave, comprising the steps of:

receiving the broadcast electric wave;

detecting a plurality of RT (Radio Text) data one after another, each of the RT data indicating information related to a broadcast content by characters in the RDS data, which are included in the received broadcast electric wave;

storing one of the detected RT data into a first storing device;

determining whether the RT data in the RDS data included in the received broadcast electric wave are changed;

storing the RT data stored in the first storing device into one of a plurality of areas of a second storing device if the RT data in the RDS data included in the received broadcast electric wave are changed;

selecting one of the plurality of areas of the second storing device by operating a plurality of selection keys, each of the selection keys corresponding to respective one of the plurality of areas of the second storing device; and displaying the RT data stored in the selected area of the second storing device.

2. The method according to claim 1, further comprising the step of protecting the selected area of the second storing device so as not to over-write another RT data thereon.

3. The method according to claim 2, wherein the step of storing the RT data into one of the plurality of areas of the second storing device comprises the steps of:

indicating any one of the plurality of areas of the second storing device;

determining whether the indicated area is protected;

indicating another one of the plurality of areas of the second storing device if the indicated area is protected; and storing the RT data stored in the first storing device into the indicated area if the indicated area is not protected.

4. The method according to claim 1, further comprising the step of notifying an area number which indicates one of the plurality of areas of the second storing device when the RT data stored in the first storing device is stored into said one of the plurality of areas of the second storing device.

5. The method according to claim 1, wherein, in the step of notifying the area number, the area number is displayed on a display device.

6. The method according to claim 1, further comprising the step of announcing the RT data stored in the selected area of the second storing device by a synthetic voice.

7. A method according to claim 1, wherein:

the RDS data includes flag data which indicates a condition of the RT data; and the determining step comprises the steps of:

detecting the flag data from the RDS data included in the received broadcast electric wave; and determining whether or not the RT data in the RDS data included in the received broadcast electric wave is changed, on the basis of whether or not the detected flag data is changed.

8. An apparatus for receiving and displaying RDS data, which is multiplexed to a broadcast electric wave, comprising:

a receiving device for receiving the broadcast electric wave;

a detecting device for detecting a plurality of RT (Radio Text) data one after another, each of the RT data indicating information related to a broadcast content by characters in the RDS data, which are included in the received broadcast electric wave;

a first storing device for storing one of the detected RT data;

a determining device for determining whether the RT data in the RDS data included in the received broadcast electric wave are changed;

a second storing device having a plurality of areas, for storing the RT data stored in the first storing device into one of the plurality of areas of the second storing device if the determining device determines that the RT data in the RDS data included in the received broadcast electric wave are changed;

a plurality of selection keys for selecting the areas of the second storing device, each of the selection keys corresponding to a respective one of the plurality of areas of the second storing device; and a display device for displaying RT data stored in the selected data of the second storing device.

9. The apparatus according to claim 8, further comprising a protection device for protecting the selected area of the second storing device so as not to over-write another RT data thereon.

10. The apparatus according to claim 9, wherein the second storing device comprising:

a first indicating device for indicating any one of the plurality of areas;

a determining device for determining whether the indicated area is protected;

a second indicating device for indicating another one of the plurality of areas if the indicated area is protected; and a data storing device for storing the RT data stored in the first storing device into the indicated area if the indicated area is not protected.

11. The apparatus according to claim 8, further comprising a notifying device for notifying an area number which indicates one of the plurality of areas of the second storing device when the RT data stored in the first storing device is stored into said one of the plurality of areas of the second storing device.

12. The apparatus according to claim 11, wherein the notifying device controls the display device to display the area number.

13. The apparatus according to claim 8, further comprising an audio unit for announcing the RT data stored in the selected area of the second storing device by a synthetic voice.

14. The apparatus according to claim 8, further comprising a scrolling key for scrolling the displayed RT data.

15. An apparatus according to claim 8, wherein:

the RDS data includes flag data which indicates a condition of the RT data; and the determining device detects the flag data from the RDS data included in the received broadcast electric wave, and determines whether or not the RT data in the RDS data included in the received broadcast electric wave is changed, on the basis of whether or not the detected flag data is changed.

16. A method of receiving and displaying RDS data, which is multiplexed to a broadcast electric wave, comprising the steps of:

receiving the broadcast electric wave;

detecting a plurality of RT (Radio Text) data one after another, each of the RT data indicating information related to a broadcast content by characters in the RDS data which is included in the received broadcast electric wave;

storing one of the detected RT data into a first storing device;

determining whether or not the RT data different from the RT data stored in the first storing device is detected in the detecting step;

storing the RT data stored in the first storing device into one of a plurality of areas of a second storing device if the RT data different from the RT data stored in the first storing device is detected;

selecting one of the plurality of areas of the second storing device by operating a plurality of selection keys, each of the selection keys corresponding to respective one of the plurality of areas of the second storing device; and displaying the RT data stored in the selected area of the second storing device.

17. A method according to claim 16, wherein:

the RDS data includes flag data which indicates a condition of the RT data; and the determining step comprises the steps of:

detecting the flag data from the RDS data included in the received broadcast electric wave; and determining whether or not the RT data different from the RT data stored in the first storing device is detected, on the basis of whether or not the detected flag data is changed.

18. An apparatus for receiving and displaying RDS data, which is multiplexed to a broadcast electric wave, comprising:

a receiving device for receiving the broadcast electric wave;

a detecting device for detecting a plurality of RT (Radio Text) data one after another, each of the RT data indicating information related to a broadcast content by characters in the RDS data which is included in the received broadcast electric wave;

a first storing device for storing one of the detected RT data;

a determining device for determining whether or not the RT data different from the RT data stored in the first storing device is detected by the detecting device;

a second storing device having a plurality of areas, for storing the RT data stored in the first storing device into one of the plurality of areas if the determining device determines that the RT data different from the RT data stored in the first storing device is detected;

a plurality of selection keys for selecting the areas of the second storing device, each of the selection keys corresponding to respective one of the plurality of areas of the second storing device; and a display device for displaying the RT data stored in the selected area of the second storing device.

19. An apparatus according to claim 18, wherein:

the RDS data includes flag data which indicates a condition of the RT data; and the determining device detects the flag data from the RDS data included in the received broadcast electric wave, and determines whether or not the RT data different from the RT data stored in the first storing device is detected, on the basis of whether or not the detected flag data is changed.

* * * * *

UNITED STATES PATENT AND TRADEMARK OFFICE

CERTIFICATE OF CORRECTION

PATENT NO. : 6,038,434

DATED : March 14, 2000

INVENTOR(S) : Takashi MIYAKE

It is certified that error appears in the above-indentified patent and that said Letters Patent is hereby corrected as shown below:

Column 11, line 17 (which is the last line of claim 8), change "data" to --area--.

Signed and Sealed this

Third Day of April, 2001

Attest:

Nicholas P. Godici

NICHOLAS P. GODICI

*Attesting Officer*

*Acting Director of the United States Patent and Trademark Office*